United States Patent
Simmons et al.

(10) Patent No.: US 11,651,749 B2
(45) Date of Patent: May 16, 2023

(54) DISPLAY LAYOUT OPTIMIZATION OF MULTIPLE MEDIA STREAMS

(71) Applicant: Panduit Corp., Tinley Park, IL (US)

(72) Inventors: Marshall D. Simmons, San Jose, CA (US); Jeremy P. Zullo, Livermore, CA (US); Alejandro Mata Sanchez, Vancouver (CA); Robert J. Paksi, Jr., Richland, MI (US)

(73) Assignee: Panduit Corp., Tinley Park, IL (US)

( * ) Notice: Subject to any disclaimer, the term of this patent is extended or adjusted under 35 U.S.C. 154(b) by 22 days.

(21) Appl. No.: 17/217,469

(22) Filed: Mar. 30, 2021

(65) Prior Publication Data

US 2022/0139356 A1    May 5, 2022

Related U.S. Application Data (60) Provisional application No. 63/108,485, filed on Nov. 2, 2020.

(51) Int. Cl.
| | |
|---|---|
| *G09G 5/14* | (2006.01) |
| *G06F 3/14* | (2006.01) |
| *G06K 9/62* | (2022.01) |
| *G09G 5/38* | (2006.01) |

(52) U.S. Cl.
CPC ............... *G09G 5/14* (2013.01); *G06F 3/14* (2013.01); *G06K 9/6267* (2013.01); *G09G 5/38* (2013.01); *G06V 2201/10* (2022.01); *G09G 2320/0613* (2013.01); *G09G 2340/0442* (2013.01); *G09G 2340/0464* (2013.01); *G09G 2370/20* (2013.01)

(58) Field of Classification Search
CPC .... G09G 5/14; G09G 5/38; G09G 2320/0613; G09G 2340/0442; G09G 2340/0464; G09G 2370/20; G06F 3/14; G06K 9/6267; G06V 2201/10; H04N 7/15
See application file for complete search history.

(56) References Cited

U.S. PATENT DOCUMENTS

| | | | |
|---|---|---|---|
| 7,840,638 B2 | 11/2010 | Zhang et al. | |
| 8,350,891 B2 | 1/2013 | Khot et al. | |
| 8,446,454 B2 | 5/2013 | Decker et al. | |
| 8,943,072 B2 | 1/2015 | Burkard et al. | |
| 9,119,070 B2 | 8/2015 | Brindza | |

(Continued)

FOREIGN PATENT DOCUMENTS

WO    2018/169735 A1    9/2018

*Primary Examiner* — Justin S Lee
(74) *Attorney, Agent, or Firm* — Christopher S. Clancy; James H. Williams (57) ABSTRACT

A system and method for optimizing a display layout of multiple video streams at a sink device is provided. The display layout of multiple streams may be dynamically optimized based on a number of different variables, including characteristics of the sink device, total number of active incoming streams, active audio, and other characteristics of the source material or device. The source of an incoming media stream may contain useful characteristics for optimizing the display layout of multiple media streams. One such characteristic of a source device may include the device type, such as laptop, PC, phone, or tablet. Information may be extracted from each incoming stream in order to predict a source device type from which the incoming media stream originates.

22 Claims, 10 Drawing Sheets

(56) References Cited

U.S. PATENT DOCUMENTS

| | | | |
|---|---|---|---|
| 9,204,291 B2 | 12/2015 | Jackson et al. | |
| 9,210,379 B2 | 12/2015 | Johnson | |
| 9,462,227 B2 | 10/2016 | Duckworth et al. | |
| 9,781,385 B2 | 10/2017 | Ma et al. | |
| 10,380,683 B1* | 8/2019 | Voutour | G06V 30/414 |
| 11,349,976 B2* | 5/2022 | Zhao | G06F 3/1454 |
| 11,367,132 B1* | 6/2022 | Catsifas | G06Q 40/02 |
| 2010/0281179 A1* | 11/2010 | Istavan | H04N 21/25891 |
| | | | 707/752 |
| 2010/0325211 A1* | 12/2010 | Ylinen | G06Q 10/06 |
| | | | 709/205 |
| 2013/0051767 A1* | 2/2013 | Soroushian | H04N 19/33 |
| | | | 375/E7.2 |
| 2013/0176301 A1* | 7/2013 | Yeon | G09G 5/00 |
| | | | 345/419 |
| 2013/0236158 A1* | 9/2013 | Lynch | H04N 21/44029 |
| | | | 386/231 |
| 2014/0173507 A1* | 6/2014 | Demeyere | G06F 3/1446 |
| | | | 715/789 |
| 2014/0233806 A1* | 8/2014 | Gossweiler | G01C 3/04 |
| | | | 382/106 |
| 2016/0014218 A1* | 1/2016 | Besehanic | H04L 69/22 |
| | | | 709/223 |
| 2016/0098169 A1 | 4/2016 | Herdy | |
| 2016/0103793 A1* | 4/2016 | Fang | G06F 3/0483 |
| | | | 715/234 |
| 2016/0301980 A1* | 10/2016 | Pratt | H04N 21/4621 |
| 2017/0078740 A1* | 3/2017 | Iwami | G09G 5/14 |
| 2017/0277902 A1* | 9/2017 | Bae | G06F 21/629 |
| 2017/0310714 A1* | 10/2017 | Jaynes | G06T 3/4092 |
| 2018/0192080 A1* | 7/2018 | Henaire | H04L 65/756 |
| 2018/0225024 A1* | 8/2018 | Tsai | G06F 3/04817 |
| 2018/0367757 A1* | 12/2018 | Faulkner | H04N 21/47 |
| 2019/0230310 A1 | 7/2019 | Faulkner | |
| 2020/0112766 A1* | 4/2020 | Reale | H04N 21/42202 |
| 2021/0193076 A1* | 6/2021 | Morrell | H04N 19/179 |
| 2021/0232271 A1* | 7/2021 | Morita | G06F 3/04842 |
| 2021/0405865 A1* | 12/2021 | Faulkner | H04N 7/147 |
| 2022/0019397 A1* | 1/2022 | Park | H04N 21/431 |

* cited by examiner

DISPLAY LAYOUT OPTIMIZATION OF MULTIPLE MEDIA STREAMS

CROSS-REFERENCE TO RELATED APPLICATION(S)

This application claims benefit to U.S. Provisional Patent Application No. 63/108,485, filed Nov. 1, 2020, the entirety of which is hereby incorporated by reference herein.

TECHNICAL FIELD

The present disclosure is directed to optimizing a display layout of multiple incoming media streams for output to a sink device and, more particularly, to dynamically optimizing the display layout based, in part, on a prediction of a type of source device from which an incoming media stream is received.

BACKGROUND

When combining multiple video streams, such as in a teleconferencing application, conventional video stream control algorithms utilize several approaches to sizing and placement of video streams. These approaches include displaying all streams in equal size, emphasizing active talker (i.e., displaying one stream larger than others), picture-in-picture, and framing (i.e., displaying small streams squared around a big stream in the middle). The result is often poor use of screen real estate and illegible text. Moreover, native streaming protocols on various operating systems do not share metadata that specifies the type of device upon which the operating system is running (e.g., laptop, PC, phone, tablet, etc.). As a result, streaming receivers often lack context for what is being viewed on the device's output, which in turn also leads to wasted screen space and sub-optimal output rendering for the end user or viewer.

SUMMARY

According to some embodiments, a media receiver is disclosed, where the media receiver comprises a memory configured to store machine-readable instructions, and a processor circuitry in communication with the memory. The processor circuitry is configured to execute the machine-readable instructions to cause the processing circuitry to receive a first media stream corresponding to a first media source, obtain first metadata from the first media stream, receive a second media stream corresponding to a second media source, obtain second metadata from the second media stream, determine a first source type for the first media source based on the first metadata, determine a second source type for the second media source based on the second metadata, generate an optimized display including the first media stream and the second media stream based on at least the first source type and the second source type, and control transmission of the optimized display to a sink device.

According to some embodiments, a method for optimizing a display layout on a display screen, the method comprising receiving, by a communication interface, a first media stream from a first media source, extracting, by a processor, first metadata from the first media stream, receiving, by the communication interface, a second media stream from a second media source, extracting, by the processor, second metadata from the second media stream, determining, by the processor, a first source type for the first media source based on the first metadata, determining, by the processor, a second source type for the second media source based on the second metadata, generating, by the processor, an optimized display including the first media stream and the second media stream based on at least the first source type and the second source type, and controlling, by the processor, transmission of the optimized display to a sink device.

DETAILED DESCRIPTION

As required, detailed embodiments are disclosed herein; however, it is to be understood that the disclosed embodiments are merely exemplary of the inventive features that may be embodied in various and alternative forms that include additional, or fewer, components and/or steps. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
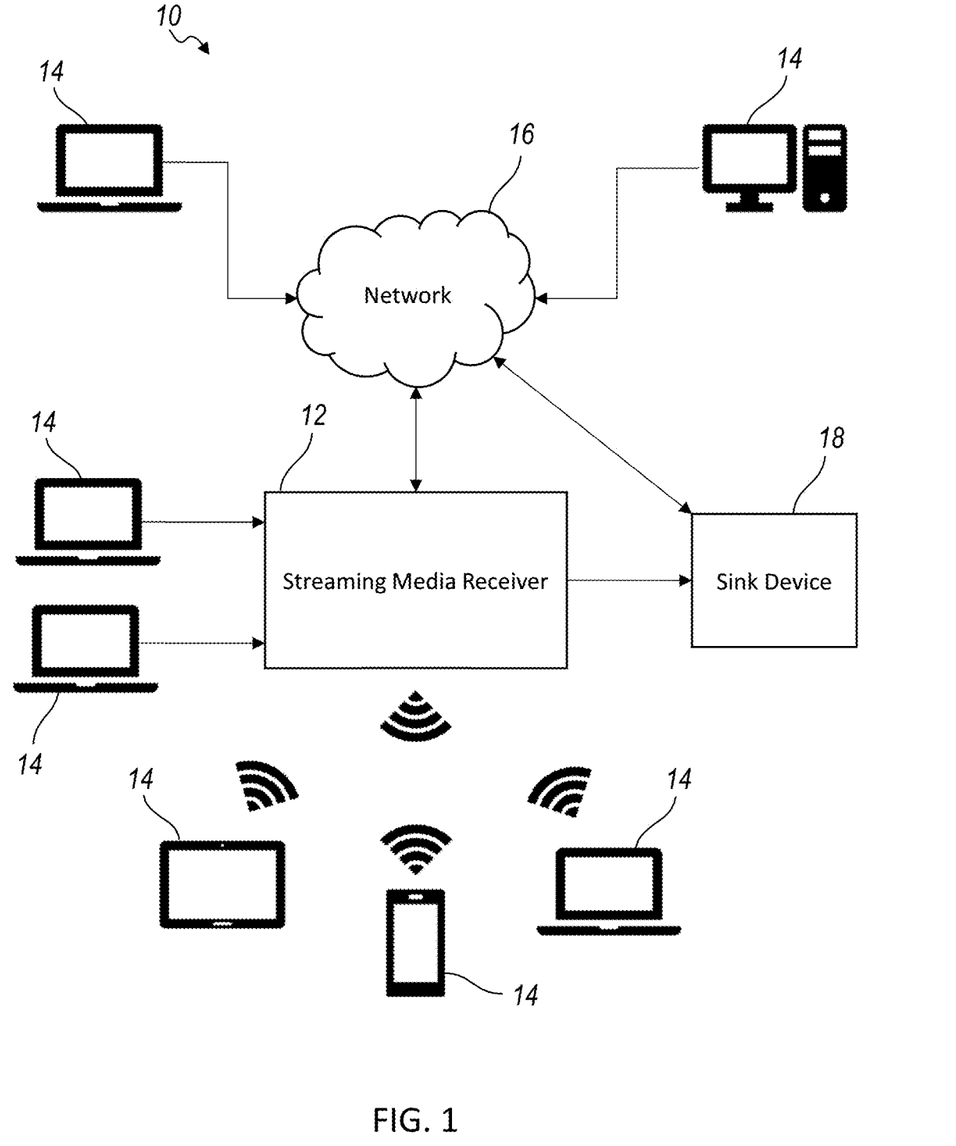
FIG. 1 shows an environmental diagram of a media presentation system including a streaming media receiver, in accordance with one or more embodiments of the present disclosure.

FIG. 1 is an environmental diagram of a media presentation system 10 including a streaming media receiver 12, in accordance with one or more embodiments of the present disclosure. The streaming media receiver 12 is configured to receive multimedia content, such as audio and/or video (A/V) streams, from one or more source devices 14. The source devices 14 may include any input media device capable of providing audio and/or video signals. For instance, the source devices 14 may include various types of computing devices or multimedia devices, such as a personal computer (PC), laptop, smartphone, tablet, or streaming media player.

The streaming media receiver 12 may be configured to connect to a network 16, such as a local area network (LAN) or a wide area network (WAN) such as the Internet. According to one or more embodiments, various source devices 14 communicate with the streaming media receiver 12 over the network 16. As shown, one or more source devices 14 wirelessly connect to the streaming media receiver 12 directly using a wireless communication protocol. In certain embodiments, one or more of the source devices 14 may connect to the streaming media receiver 12 directly using a wire or cable, such as USB, HDMI, DisplayPort or the like.

The streaming media receiver 12 is further configured to process and analyze multiple incoming media streams from a plurality of the source devices 14 and generate an output media signal, where the output media signal is transmitted to at least one sink device 18. The sink device 18 may refer to any output media device or endpoint of a given device output configured to receive audio and/or video signals, such as a display, television, projector, video conferencing system, A/V switch, or the like.

The output media signal is a composited stream going out to the sink device 18 that includes a plurality of the incoming media streams from the source devices 14. The streaming media receiver 12 may output the composited stream to the sink device 18 as a single, flattened stream. The composited and flattened stream of the output media signal may include metadata corresponding to attributes of their respective source device 14, where the attribute metadata may then be used for controlling the output at the end user's interface or sink device.

According to one or more embodiments of the present disclosure, the streaming media receiver 12 optimizes the display layout of the multiple incoming media streams from the plurality of source devices 14 when combining the streams for output to the sink device 18. Accordingly, these attributes may relate to the sizing, position, scaling, orientation, aspect ratio, and other features of the incoming media streams to enhance the display layout of multiple streams. Optimizing the display layout for the multiple incoming video streams at the sink device 18 provides for more efficient use of screen real estate and can provide advantages such as increasing the legibility of text. For example, by optimizing the sizing and placement of the video streams, wasted screen space can be minimized and illegible text can be addressed to make more legible (e.g., increase text size by increasing display window) when multiple video streams are displayed.

The display layout of multiple streams may be optimized based on a number of different variables, including characteristics of the sink device 18, total number of active incoming streams, active audio, and other characteristics of the source material or device. The source of an incoming media stream may contain useful characteristics for optimizing the display layout of multiple media streams. One such characteristic of the source may include the device type, such as laptop, PC, phone, or tablet. As set forth above, native streaming protocols on operating systems such as Microsoft Windows, Apple OSX, Apple iPadOS, Apple iOS and Android do not directly share metadata about the specific type of device upon which the operating system is running. Accordingly, one or more embodiments of the present disclosure may provide a system, apparatus, and method for predicting the device type of a source device providing an incoming media stream to the streaming media receiver 12 based on available metadata and/or other attribute information obtained from the incoming media streams.

Figure 2:
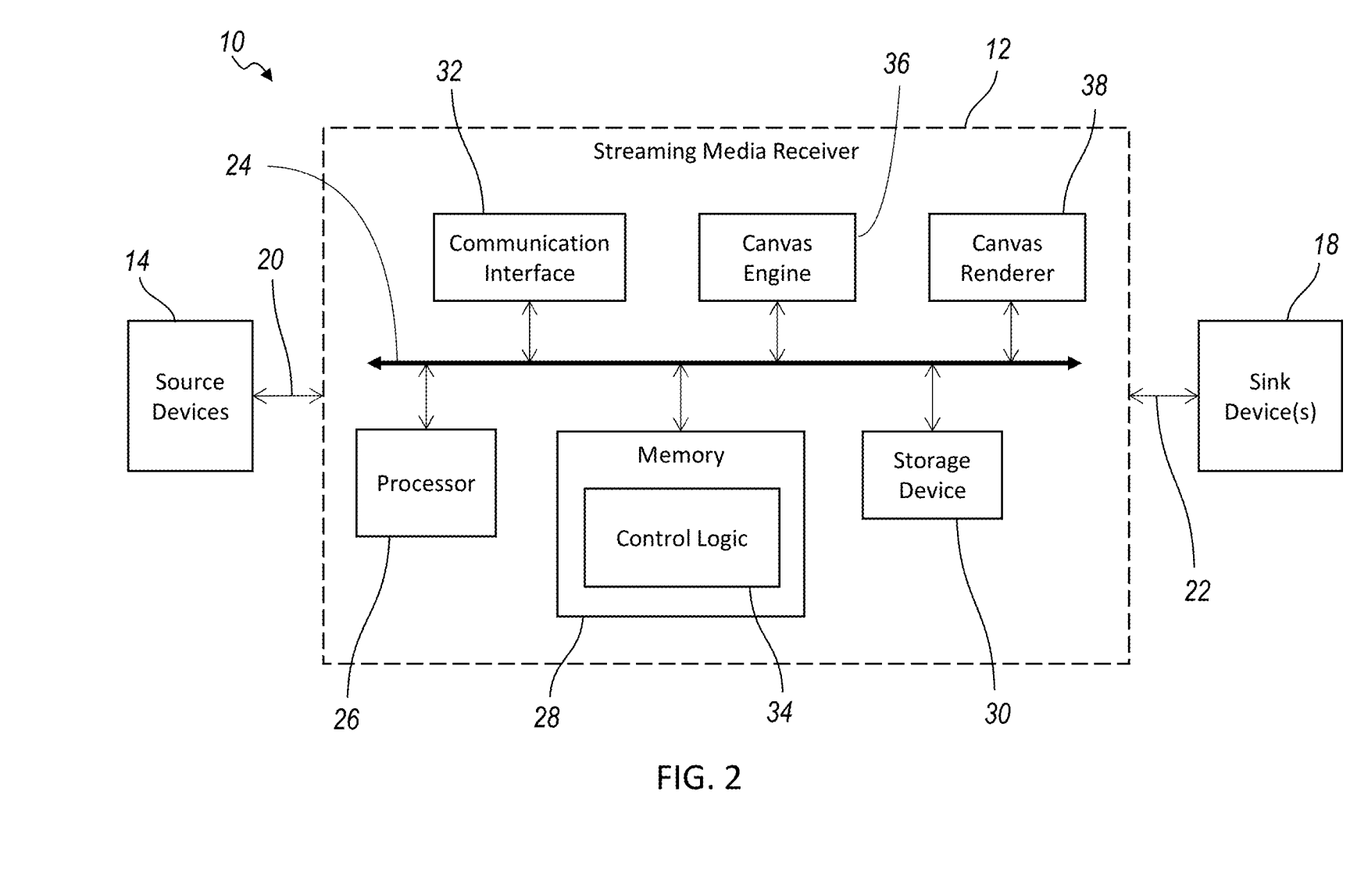
FIG. 2 shows a block diagram of the system from FIG. 1 including a more detailed view of the streaming media receiver.

FIG. 2 is a block diagram of the system 10 from FIG. 1 including a more detailed view of the streaming media receiver 12. According to one or more embodiments, the streaming media receiver 12 is configured to detect a source device type associated with an input media stream 20 and optimize a display layout of multiple input media streams based, at least in part, on the predicted source device type of each stream. The streaming media receiver 12 may be configured to receive multiple input media streams 20 from the plurality of source devices 14 and generate an output media signal 22 to one or more sink devices 18, as described in FIG. 1. As shown in FIG. 2, the sink device 18 is external to the streaming media receiver 12, and accessible via direct communication with the streaming media receiver 12 or via the network 16 (i.e., Network sink device). In one or more alternate embodiments, the sink device 18 may be integrated with the streaming media receiver 12 within a single device. Additionally, the streaming media receiver 12 may be a stand-alone device or may be integrated as a component within another computing unit or device.

As shown in FIG. 2, the streaming media receiver 12 includes a bus 24, a processor 26, a memory 28, a secondary storage device 30, and a communication interface 32. The bus 24 may include components that permit communication among the other components of the streaming media receiver 12. The processor 26 may be any type of processing component implemented in hardware, firmware, or a combination of hardware and software. This may include a central processing unit (CPU), a graphics processing unit (GPU), a microprocessor, a microcontroller, an application-specific integrated circuit (ASIC), or similar processing component. The processor 26 may include one or more processors capable of being programmed to perform functions or processes such as for controlling one or more components of the streaming media receiver 12. The memory 28 may store information and instructions for use by the processor 26. For example, the processor 26 may be configured to read and execute instructions stored on the memory 28 to perform functions. This may include control logic 34, such as computer software, and data. The memory 28 may include a random access memory (RAM), a read only memory (ROM), and/or another type of dynamic or static storage device (e.g., a flash memory, a magnetic memory, and/or an optical memory). The secondary storage device 30 may also store information and/or software related to the operation and use of the streaming media receiver 12. For example, the secondary storage device 30 may include a hard disk drive and/or a removable storage device or drive, as well as other types of storage device and/or non-transitory computer-readable medium.

The streaming media receiver 12 also includes a canvas engine 36 and a canvas renderer 38. The canvas engine 36 and the canvas renderer 38 may be embodied as hardware, software, or a combination of hardware and software. Thus, while depicted as separate components, the canvas engine 36 and the canvas renderer 38 may be integrated with the processor 26 and/or with the memory 28 or secondary storage device 30 as control logic. The canvas engine 36 is configured to take a combination of one or more of the different variables, which may include characteristics of the sink device 18, total number of active incoming streams, active audio, and other characteristics of the source material or source devices 14, and instruct the canvas renderer 38 how to optimally display the multiple input media streams 20 collectively at the sink device 18. Accordingly, the canvas renderer 38 may receive this instruction and generate the output media signal 22 for the sink device 18.

The communication interface 32 may include one or more transceivers or transceiver-like components (e.g., a separate receiver and transmitter) that enables the streaming media receiver 12 to communicate with the source devices 14 and the sink device 18, such as via a wired connection, a wireless connection, or a combination of wired and wireless connections. The communication interface 32 permits the streaming media receiver 12 to receive information from another device, such as from the input media streams 20 from the plurality of source devices 14. The communication interface 32 may further permit the streaming media receiver 12 to provide information to another device, including the output media signal 22 to the sink device 18. For example, the communication interface 32 may include an Ethernet interface, an optical interface, a coaxial interface, an infrared interface, a radio frequency (RF) interface, a universal serial bus (USB) interface, a Wi-Fi interface, a cellular network interface, and/or the like.

The streaming media receiver 12 may perform one or more processes described herein. The streaming media receiver 12 may perform these processes based on the processor executing software instructions stored on a non-transitory machine-readable medium (e.g., the machine may be a computer device), such as the memory 28 and/or the storage device 30. A machine-readable medium is defined herein as a non-transitory memory device, which may include memory space within a single physical storage device or memory space spread across multiple physical storage devices. Software instructions may be read into the memory 28 or the storage device 30 from another machine-readable medium or from another device via the communication interface 32. The software instructions stored in memory 28 and/or the storage device 30, when executed, may cause the processor 26 to perform one or more processes described in the present disclosure. Additionally, or alternatively, hardwired circuitry may be used in place of, or in combination with, software instructions to perform one or more processes described herein. Thus, the various implementations described herein may not be limited to any specific combination of hardware circuitry and software.

The arrangement and/or number of components shown in FIG. 2 are provided as an example. In practice, the streaming media receiver 12 or similar device may include additional components, fewer components, different components, or differently arranged components than those shown. Additionally, or alternatively, one or more components of the streaming media receiver 12 may perform one or more functions described as being performed by another set of components of the streaming media receiver.

Figure 3:
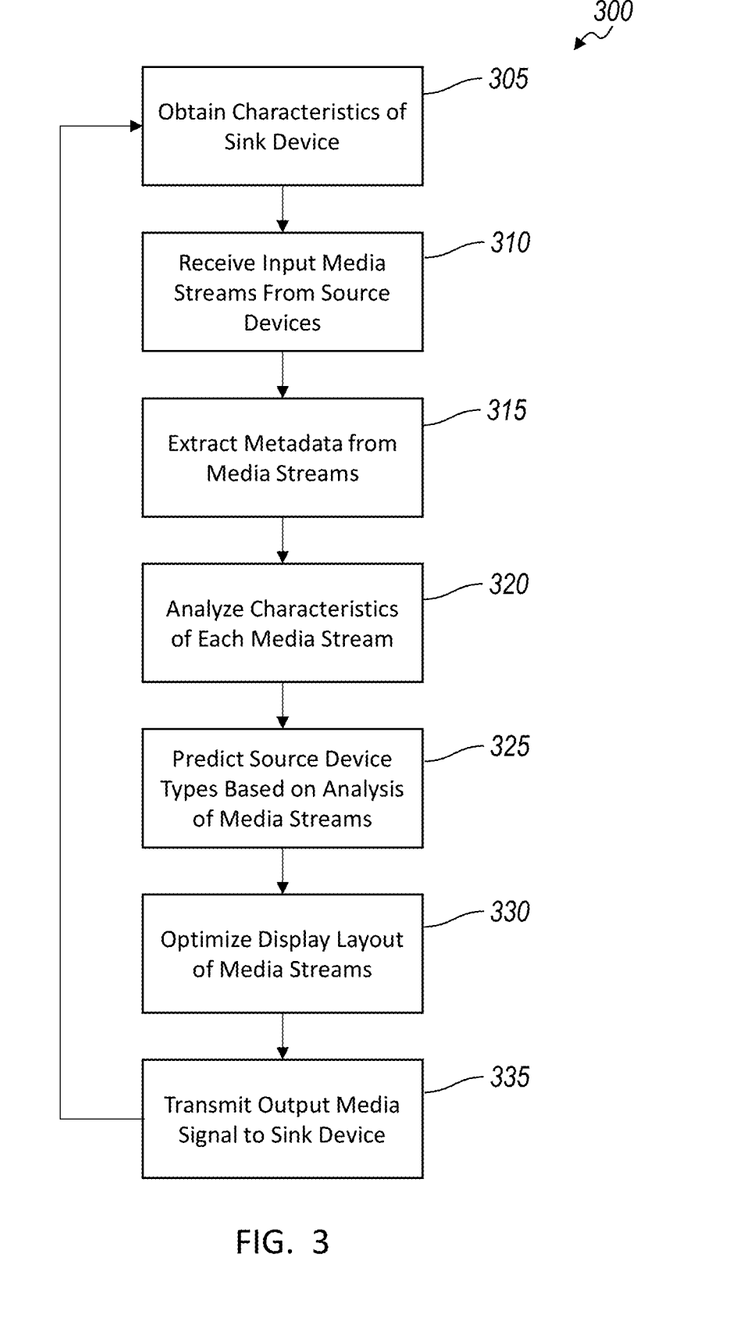
FIG. 3 shows an exemplary flow chart depicting a process for optimizing a display layout of multiple media streams, in accordance with one or more embodiments of the present disclosure.

FIG. 3 is an exemplary flow chart 300 depicting a process for optimizing a display layout of multiple media streams, in accordance with one or more embodiments of the present disclosure. The display layout may be optimized based on information gathered by the streaming media receiver 12 from a number of different variables. Information and/or variables for display layout optimization may include characteristics of the sink device 18, metadata extracted from each incoming media stream 20, total number of active incoming media streams, and the like. As will be described in greater detail, the metadata extracted from each incoming media stream 20 may allow the streaming media receiver 12 to predict the type of source device corresponding to each media stream, which may be used to further enhance optimization of the display layout of multiple streams.

The process described in the flow chart 300 includes obtaining characteristics of the sink device 18, as provided at step 305. Characteristics of the sink device 18 may include a size, an aspect ratio, and a resolution of the sink device. Additional characteristics of the sink device 18 may include an average viewing distance a user is from the sink device. The average user viewing distance from the sink device may be relevant, for example, in a conference room or lecture hall application. Some of the sink characteristics may be automatically determined by the streaming media receiver 12, such as aspect ratio and resolution. Other characteristics may be obtained from a user's input. For instance, upon configuration of the streaming media receiver 12, various sink characteristics may be entered by a user, including the size of the sink device and the average user viewing distance from the sink device.

The streaming media receiver 12 receives one or more incoming or input media streams 20 from a plurality of source devices 14, as provided at step 310. As previously described, the input media streams 20 may be received wirelessly from the source devices 14 or via a wired connection, such as an ethernet connection to the network or a direct cable connection to the streaming media receiver 12 (e.g., USB, HDMI, etc.).

Metadata is extracted from each input media stream 20 to collect information about the streams and their corresponding source devices, as provided at step 315. The metadata extracted from each input media stream 20 may include information and/or characteristics about each media stream such as a MAC address, stream aspect ratio, stream resolution, streaming protocol, and the like.

Once extracted, the streaming media receiver 12 processes and analyzes the characteristics of each input from the media streams of the source devices 12, as provided at step 320. In some implementations, this may include identifying which streams include active audio and, if multiple streams have active audio, which streams have priority. According to one or more embodiments, the streaming media receiver 12 predicts the type of source device from which each media stream originated based on the analysis of various characteristics extracted from a stream's metadata, as provided at step 325. Examples of source device types that may be predicted include laptop, PC, smartphone, tablet, and the like. Various examples of methods for predicting a source device type are described in greater detail below in connection with FIGS. 5-9.

The streaming media receiver 12 then processes one or more of the sink characteristics, input stream characteristics, and/or predicted source device types, and generates an optimized display layout of a plurality of the incoming media streams for display at the sink device 18, as provided at step 330. For example, a display layout may be generated that optimizes the sizing and placement of the active input media streams at the sink device 18. In optimizing the display layout of multiple media streams for the sink device 18, the streaming media receiver 12 may utilize the sink characteristics, input stream characteristics, and source device type, among other things, to minimize wasted screen space and increase clarity and legibility of streamed images, video, and text. The streaming media receiver 12 may use the canvas engine 36 to optimize the display layout of multiple incoming media streams based on the available metadata and sink characteristics.

Upon generating an optimized display layout of the multiple input media streams, the streaming media receiver 12 transmits the output media signal 22 to the sink device 18, as provided at step 335. As previously described, the output media signal 22 may be a single, flattened stream including a composite of the multiple input media streams 20 arranged in the optimized display layout. According to one or more embodiments, the canvas renderer 38 may be employed to generate the output media signal 22 based on instructions received from the canvas engine 36.

The transmission of the output media signal 22 may be dynamic and its transmission from the streaming media receiver 12 to the sink device 18 may be continuous. Accordingly, the optimization of the display layout at the sink device 18 of the multiple incoming media streams may also be continuous and dynamic, particularly as the number, content, and source of the input media streams change. For example, as an incoming media stream is added or removed, the components and logic modules of the streaming media receiver 12 may process all active stream characteristics to determine the most optimized sizing and placement of the current active media streams and update the output media signal 22 accordingly. As an active media stream changes any of its characteristics, such as device type or orientation, the newly available characteristics may be processed to determine the most optimized sizing and placement of all the current active media streams. Moreover, it is possible that sink characteristic may change or be altered. As a sink characteristic changes, the newly available sink characteristics may also be processed to determine the most optimized sizing and placement of all the current active media streams.

Figure 4:
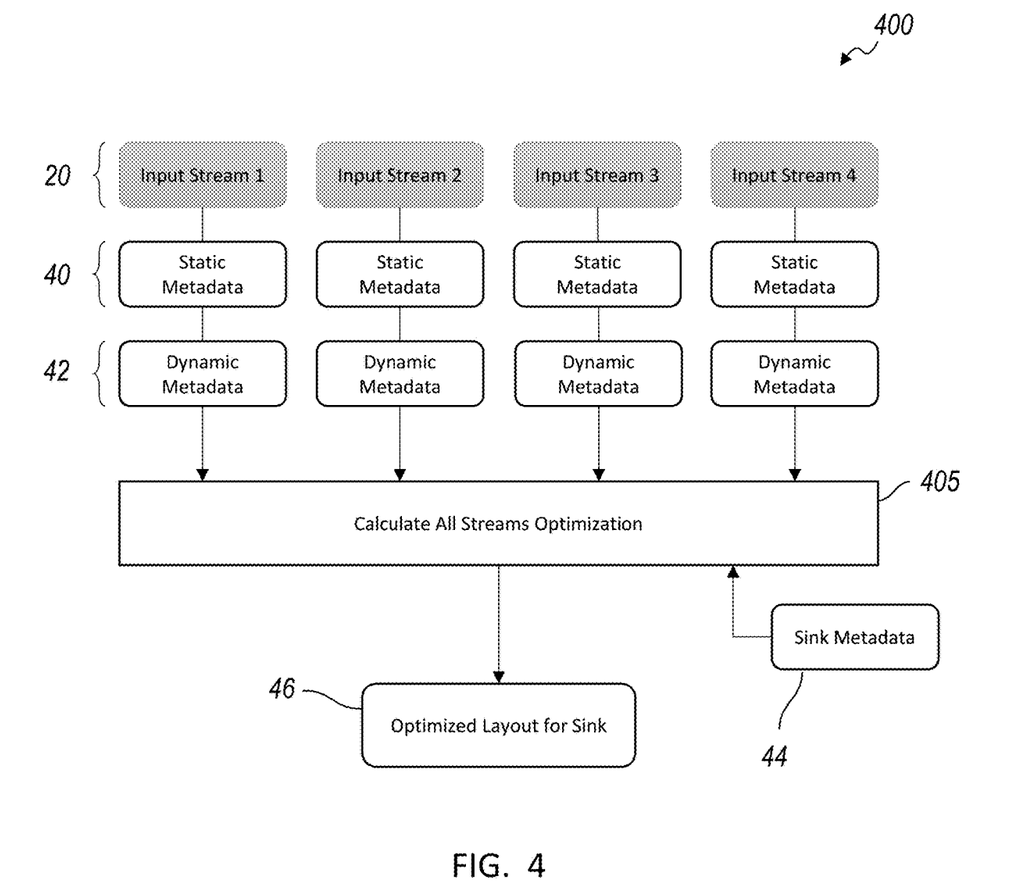
FIG. 4 shows an exemplary flow diagram depicting the flow of signals, data, and/or corresponding information used in optimizing a display layout, in accordance with one or more embodiments of the present disclosure.

FIG. 4 is an exemplary flow diagram 400 depicting the flow of signals, data, and/or corresponding information used in optimizing the display layout, in accordance with one or more embodiments of the present disclosure. Four input media streams 20 are depicted, though the streaming media receiver 12 may be configured to receive, process, and optimize a display layout of any number of input media streams. As shown, the metadata extracted from each input media stream 20 may be categorized as static metadata 40 or dynamic metadata 42. The static metadata 40 may include characteristics indicative of the type of source device, as well as mac address, protocol, DPI, and/or hostname. The dynamic metadata 42 of each input stream 20 may include information or characteristics such as screen orientation, aspect ratio, resolution, and/or content (e.g., via computer vision), as well as whether the stream includes active audio. The stream metadata 40, 42 and sink metadata 44 may be used in a process (405) that analyzes, calculates, and generates an optimized display layout 46 of all active input streams, which may then be transmitted to the sink device 18. The process (405) for generating the optimized display layout 46 show in FIG. 4 may be illustrative of an alternative embodiment to step 330 from the method 300 described in FIG. 3.

In order to optimize the display layout of multiple streams displayed simultaneously, it is helpful to understand the type of device from which each input media stream originates. Examples of source device types that may transmit media streams to the streaming media receiver 12 include laptops, PCs, smartphones, tablets, and the like. Because native streaming protocols on operating systems do not share metadata about the type of device upon which the operating system is running, the source device type may be deduced from other available information. As previously mentioned, the streaming media receiver 12 may predict the type of source device from which each input media stream 20 originated based on the analysis of various characteristics extracted from the input media stream's metadata.

Figure 5:
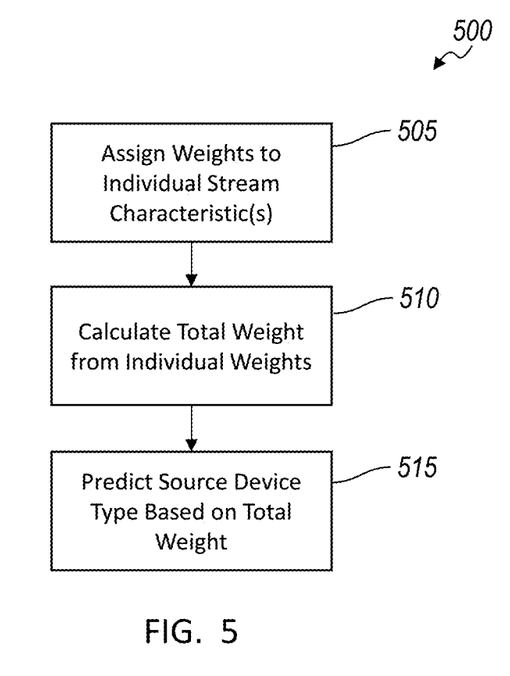
FIG. 5 shows an exemplary flow chart depicting a process for predicting a source device type based on an analysis of an input media stream, in accordance with one or more embodiments of the present disclosure.

FIG. 5 is an exemplary flow chart 500 depicting a process for predicting a source device type based on an analysis of an input media stream, in accordance with one or more embodiments of the present disclosure. Accordingly, the method described by the flow chart 500 may be an expansion of step 325 from the process described in flow chart 300 shown in FIG. 3.

To predict a source device type, the streaming media receiver 12 assigns weights to various characteristics of each input media stream 20, as provided at step 505. At step 510, a total stream weight is calculated from one or more of the individual weights. For example, one or more individual weights may be summed to provide a final total stream weight. The individual weights and/or the total stream weight may provide an indication of the type of source device from which an input media stream 20 is received within a degree of certainty. To this end, various aspects of an incoming media stream are given differing values based on characteristics extracted from the stream's metadata and weighted accordingly to generate a final prediction or confidence level regarding the type of source device, as provided at step 515.

The final or total stream weight may then be linked to the corresponding input media stream for use in optimizing the display layout of multiple streams at the sink device 18. Although the final weight calculated for each input media stream 20 is linked thereto, the weight may be out of band and can dynamically change as characteristics of the input media stream change. Using the weight information, the streaming media receiver 12 may determine whether a given input media stream is being received from, for example, a laptop, PC, phone, or tablet.

Figure 6:
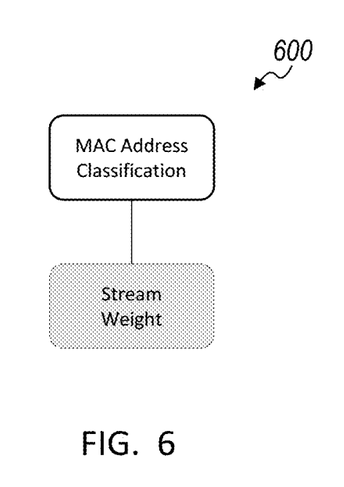
FIG. 6 shows a flow diagram illustrating a first exemplary embodiment for predicting a source device type based on one or more characteristics of an input media stream, in accordance with one or more embodiments of the present disclosure.

One or several characteristics of each input media stream 20, once extracted from the metadata, may be analyzed and weighted. FIG. 6 depicts a flow diagram 600 illustrating a first example embodiment for predicting a source device type based on these one or more characteristics. According to the first embodiment, the streaming media receiver 12 may receive and process the media access control (MAC) address of an input media stream. If the MAC address is coming from a Layer 3 or above switch, address resolution protocol (ARP) commands may be used to resolve the MAC address with the incoming media stream. Based on the MAC address, the streaming media receiver may attempt to determine the source device type (e.g. laptop, PC, phone, tablet) from which the input media stream is being transmitted. This MAC address classification may be accomplished by maintaining a dataset of MAC addresses, including Organizationally Unique Identifier (OUI) and Network Interface Controller (NIC), as well as identifying key MAC address ranges for explicit user device manufacture model types. The method may provide a weight that helps predict the type of device that is sending the input media stream, with a degree of certainty. The identification of either the OUI or the NIC may determine a weight given based on the MAC address classification, which may be expressed as a sum of individual weights assigned to the OUI and NIC, as shown by Equation 1 below:

$$OUI_{weight} + NIC_{weight} = \text{Total Stream Weight} \qquad \text{(Eq. 1)}$$

Figure 7:
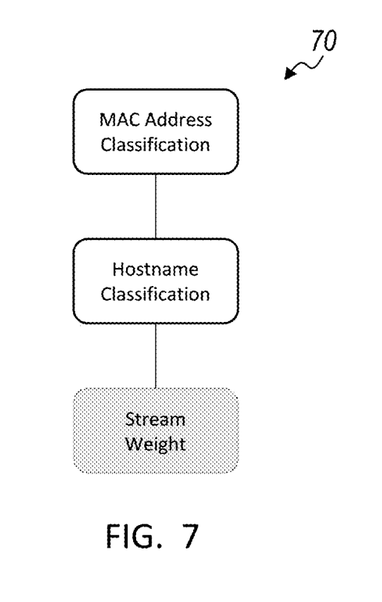
FIG. 7 shows a flow diagram illustrating a second exemplary embodiment for predicting a source device type based on one or more characteristics of an input media stream, in accordance with one or more embodiments of the present disclosure.

FIG. 7 depicts a flow diagram 700 illustrating a second example embodiment for predicting a source device type based on one or more characteristics of an input media stream 20. According to the second embodiment, the streaming media receiver 12 may further analyze a Hostname included in the metadata of the input media stream. The streaming media receiver 12 attempts to receive the Hostname and, if successful, seek key identification information in the Hostname that will help with identifying the source device type. This may be accomplished by maintaining a dataset of known Hostname prefixes and/or suffixes that manufacturers use by default on specific device model types. For example, if the Hostname is identified as "Mary's iPhone," it may indicate with some degree of certainty that the device type is a smartphone and, more particularly, a specific make and/or model of smartphone. Accordingly, an individual weight may be assigned to the Hostname (Hostname$_{weight}$) of an input media stream. In some implementations, the individual weight from the Hostname may be combined with the weight from the MAC address classification, as shown by Equation 2 below:

$$(OUI_{weight} + NIC_{weight}) + Hostname_{weight} = \text{Total Stream Weight} \qquad \text{(Eq. 2)}$$

Figure 8:
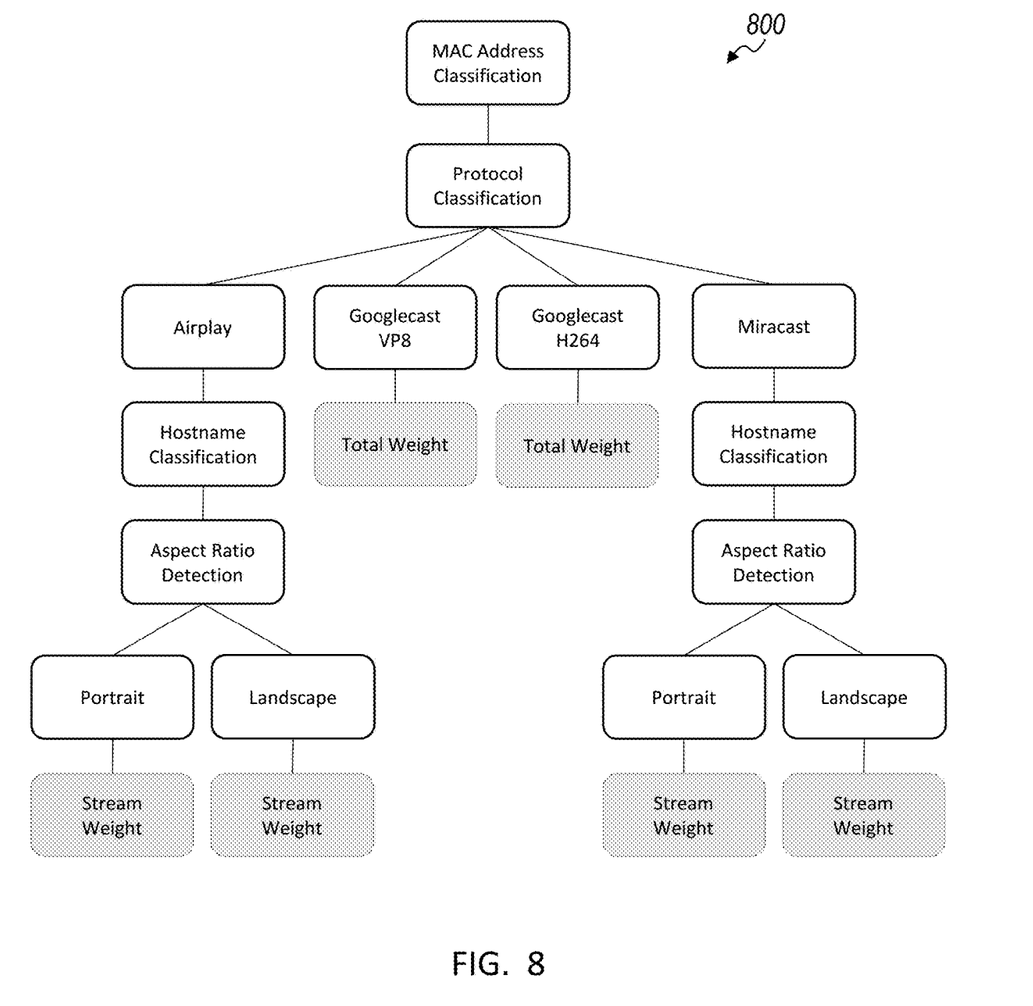
FIG. 8 shows a flow diagram illustrating a third exemplary embodiment for predicting a source device type based on one or more characteristics of an input media stream, in accordance with one or more embodiments of the present disclosure.

FIG. 8 depicts a flow diagram 800 illustrating a third example embodiment for predicting a source device type based on one or more characteristics of an input media stream 20. According to the third embodiment, the streaming media receiver 12 may further analyze a streaming protocol associated with the input media stream. The analysis of the streaming protocol may also include an analysis of an aspect ratio and a resolution of the input media stream. For example, the streaming media receiver 12 sorts the incoming media streams by streaming protocol for further analysis. The input media streams may be first sorted by streaming protocol because each protocol may have different methods for classification and may help narrow down source device types or at least narrow down the manufacturer of the source device 14. For example, an Airplay streaming protocol may indicate the source device is an Apple device.

Once sorted by streaming protocol, the streaming media receiver 12 may then analyze the aspect ratio and screen resolution. A dataset of common screen resolutions and aspect ratios used by specific manufacturer model types may be kept and stored in memory 28 or storage device 30 in order to help identify the source device type. Individual weights may be assigned to each of the streaming protocol, aspect ratio, and resolution characteristics. In certain implementations, these individual weights may be combined with one or more of the weights from the MAC address classification and Hostname classification to provide the total stream weight used in predicting the source device type, as shown by Equation 3 below:

$$(OUI_{weight} + NIC_{weight}) + Hostname_{weight} + (Protocol_{weight} + Aspect_{weight} + Resolution_{weight}) = \text{Total Stream Weight} \qquad \text{(Eq. 3)}$$

Figure 9:
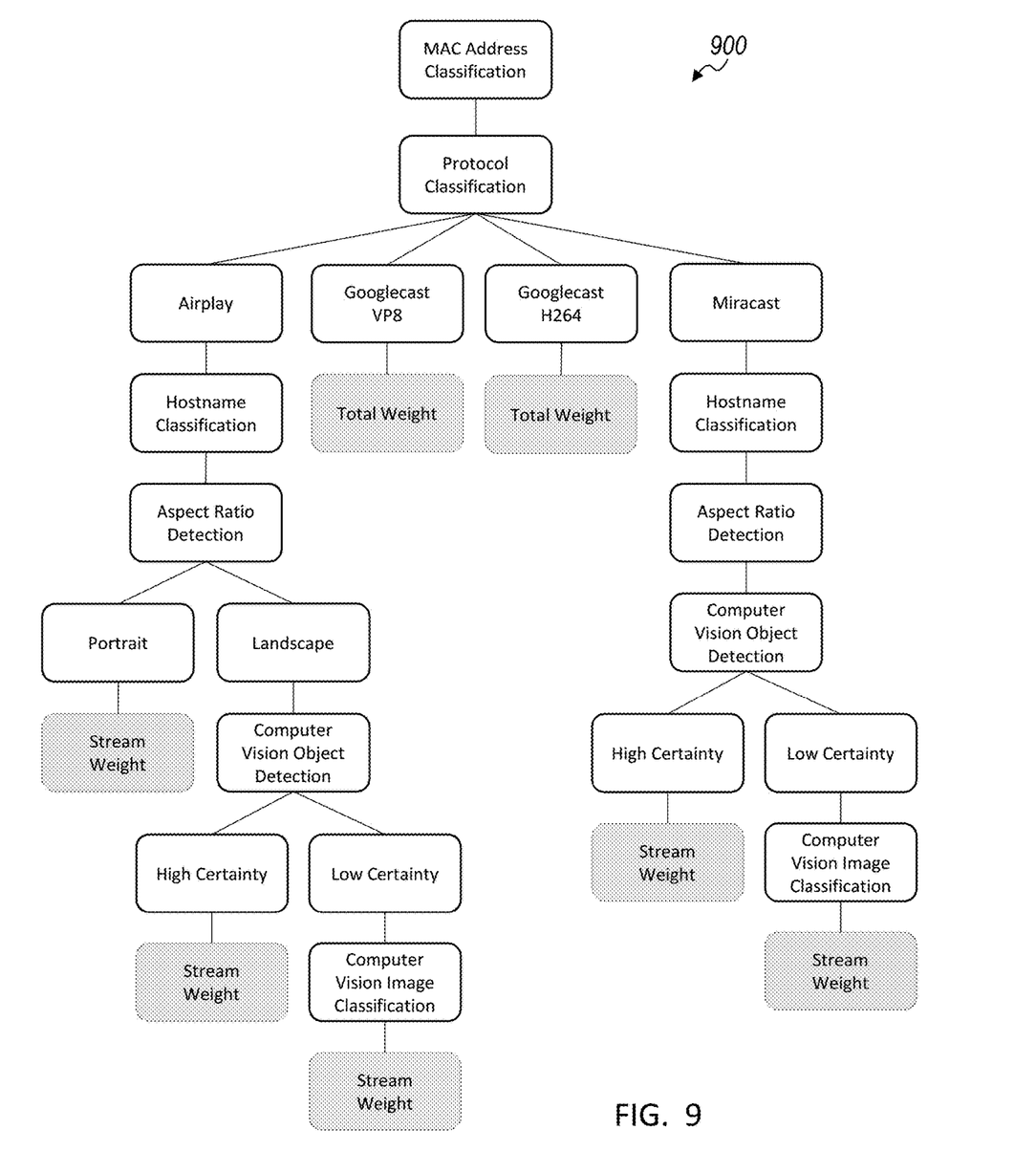
FIG. 9 shows a flow diagram illustrating a fourth exemplary embodiment for predicting a source device type based on one or more characteristics of an input media stream, in accordance with one or more embodiments of the present disclosure.

FIG. 9 depicts a flow diagram 900 illustrating a fourth example embodiment for predicting a source device type based on one or more characteristics of an input media stream 20. According to the fourth embodiment, the streaming media receiver 12 may further analyze the input media stream via Computer Vision Object Detection (CVOD) and Computer Vision Image Classification (CVIC) technology. In some implementations, Computer Vision Object Detection may be employed initially. The streaming media receiver 12 utilizes Computer Vision Object Detection to analyze the first few video frames of the input media stream 20. In doing so, the streaming media receiver 12 may scan for specific objects in the frame(s). This may be accomplished using an internal trained model dataset to compare against the frames of the input media stream. The internal trained model dataset may be stored in the memory 28 or the secondary storage device 30. Examples of specific objects may include task bar objects, start menu icons, home screen or background imagery, logos, or the like. The internal trained model dataset may be employed to recognize or detect objects in the frames that may help indicate the source device type of the input media stream 20, as certain objects may be associated with certain device types or manufacturers. Accordingly, the streaming media receiver 12 may assign an individual weight based on the Computer Vision Object Detection process (CVOD$_{weight}$). As shown, the Computer Vision Object Detection process may result in predicting source device type using the object recognition techniques for detecting specific objects from image or video data.

If the CVOD$_{weight}$ corresponds to a relatively low certainty level, the streaming media receiver 12 may then use Computer Vision Image Classification to further analyze the input media stream 20. Using the same video frames from the Computer Vision Object Detection process, the streaming media receiver 12 may classify an image as coming from a particular source device type using a different internal trained model dataset stored in memory. Accordingly, the streaming media receiver 12 may assign an individual weight based on the Computer Vision Image Classification process (CVIC$_{weight}$). In certain implementations, the individual weights, CVOD$_{weight}$ and CVIC$_{weight}$, may be combined with one or more of the weights from the MAC address classification, Hostname classification, and Protocol classification processes to provide the total stream weight used in predicting the source device type, as shown by Equation 4 below:

$$(OUI_{weight} + NIC_{weight}) + Hostname_{weight} + (Protocol_{weight} + Aspect_{weight} + Resolution_{weight}) + (CVOD_{weight} + CVIC_{weight}) = \text{Total Stream Weight} \qquad \text{(Eq. 4)}$$

As shown, various individual weights may be combined into broader classifications and summed to provide a weight total for each classification. It should be noted that the classifications are exemplary only. Moreover, the individual weights corresponding to each classification are also exemplary and may be grouped or organized in a manner other than depicted in FIGS. 6-9. Any combination of one or more individual weights may be used in calculating the total stream weight and subsequently employed in predicting the source device type.

A dynamic, optimized display layout of multiple incoming media streams based on the various characteristics described herein, including the source device type of an incoming media stream may reduce wasted screen space, increase legibility, and ultimately enhance the viewing experience. By way of example, FIGS. 10-16 illustrate a sample progression of a display layout 50 depicting how the streaming media receiver 12 may optimize the overall display layout 50 as different source devices 14 connect and transmit media streams 20 dynamically to the streaming media receiver 12. As shown in FIGS. 10-16, rather than giving equal screen space for each input media stream 20, the display layout 50 is dynamically optimized using the techniques described herein to provide an enhanced viewing experience for end users.

Figure 10:
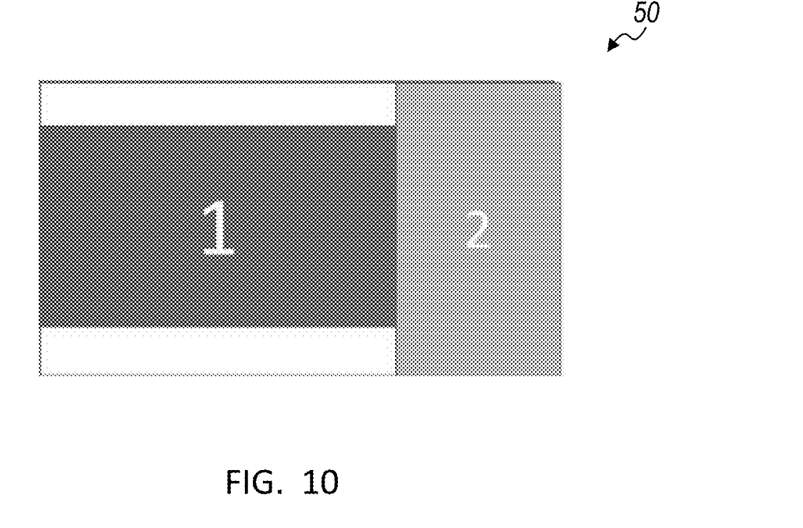
FIG. 10 shows an exemplary display layout that is optimized in accordance with one or more embodiments of the present disclosure.
Figure 11:
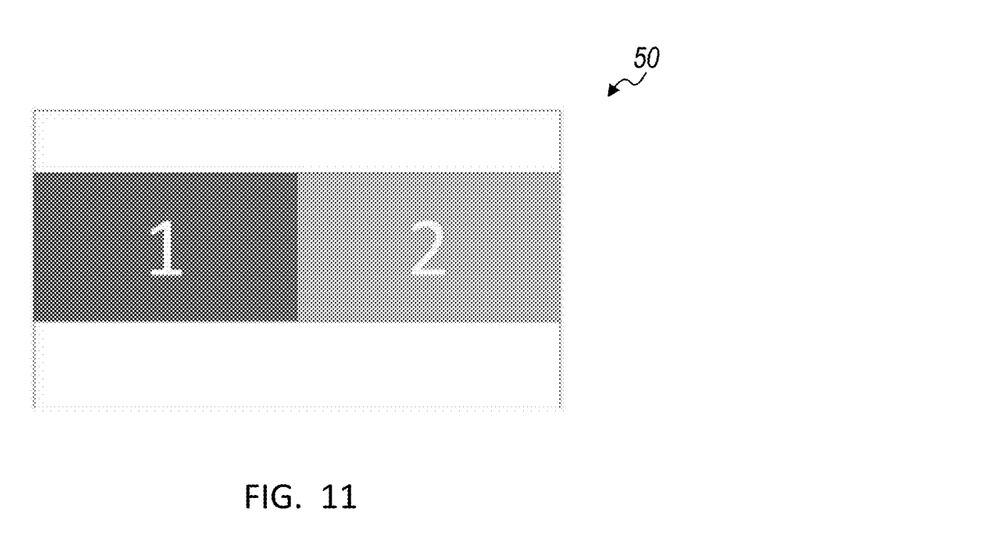
FIG. 11 shows an exemplary display layout that is optimized in accordance with one or more embodiments of the present disclosure.

FIG. 10 illustrates an exemplary display layout 50 of two input media streams. In this example, a first input media stream may be received from a first source device (1), which is a laptop. A second input media stream may be received from a second source device (2), which is a smartphone. As shown, the second source device, a smartphone, is oriented in a "portrait" mode or vertically, such that the aspect ratio includes a width lesser than a height (e.g., 9:16). FIG. 11 illustrates how the display layout 50 from FIG. 10 may change when the orientation of the second source device (2) is rotated, changing its aspect ratio to one of a widescreen or "landscape" mode (e.g., from 9:16 to 16:9).

Figure 12:
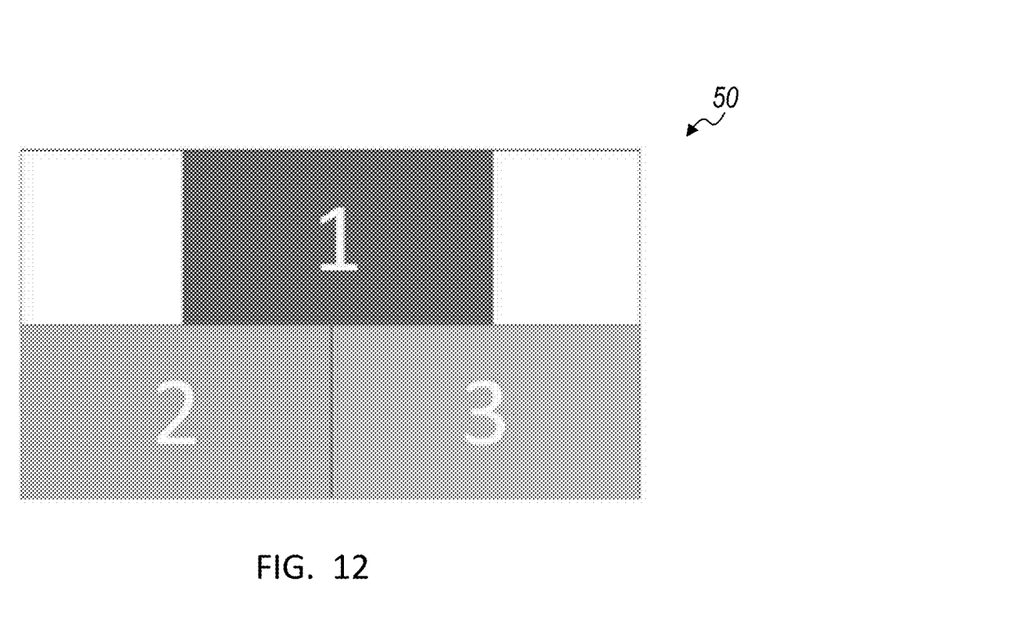
FIG. 12 shows an exemplary display layout that is optimized in accordance with one or more embodiments of the present disclosure.
Figure 13:
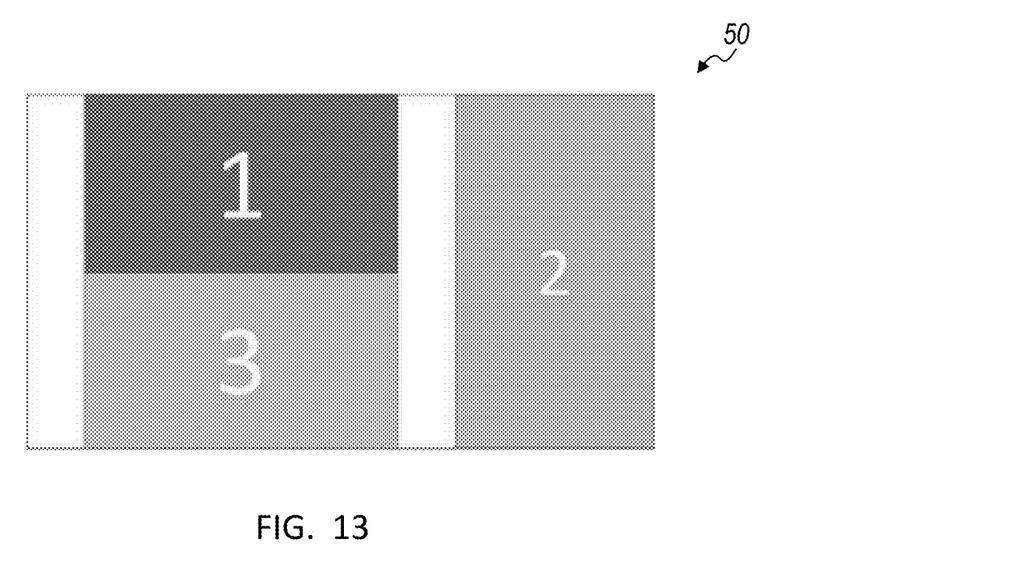
FIG. 13 shows an exemplary display layout that is optimized in accordance with one or more embodiments of the present disclosure.

FIG. 12 illustrates how the display layout 50 from FIG. 10 may change when a third input media stream is received from a third source device (3), which may be another laptop, when the third source device (3) actively connects to the streaming media receiver 12. FIG. 13 illustrates how the display layout 50 from FIG. 12 may change when the orientation of the second source device (2) is rotated, changing its aspect ratio to one of a widescreen or landscape mode (e.g., from 9:16 to 16:9), similar to FIG. 11.

Figure 14:
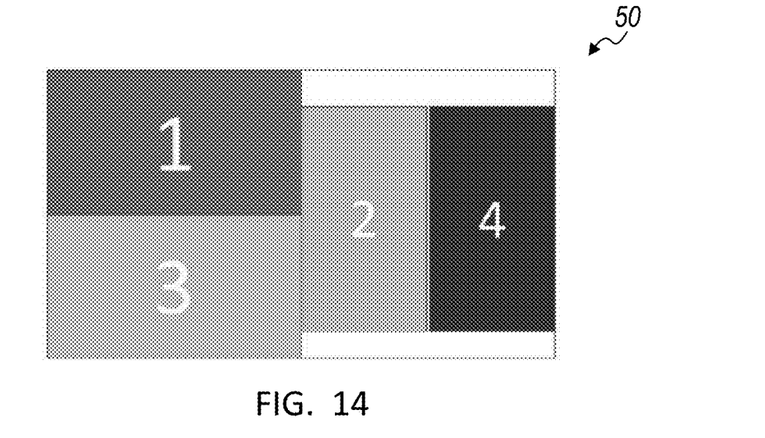
FIG. 14 shows an exemplary display layout that is optimized in accordance with one or more embodiments of the present disclosure.
Figure 15:
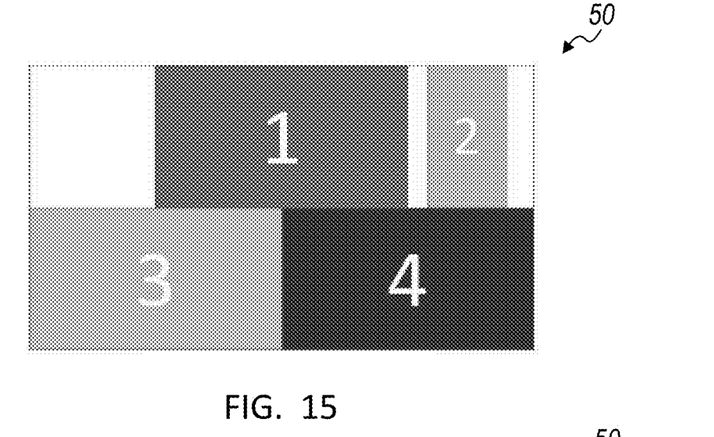
FIG. 15 shows an exemplary display layout that is optimized in accordance with one or more embodiments of the present disclosure.
Figure 16:
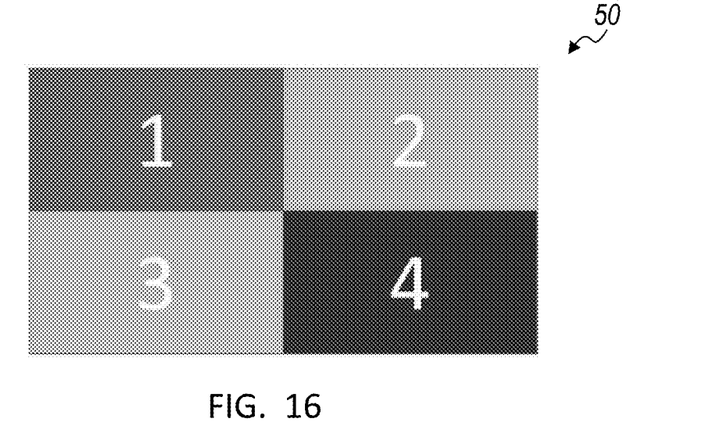
FIG. 16 shows an exemplary display layout that is optimized in accordance with one or more embodiments of the present disclosure.

FIG. 14 illustrates how the display layout 50 from FIG. 12 may change when a fourth input media stream is received from a fourth source device (4), which may be another smartphone, when the fourth source device (4) actively connects to the streaming media receiver 12 in portrait mode. FIG. 15 illustrates how the display layout 50 from FIG. 14 may change when the orientation of the fourth source device (4) is rotated, changing its aspect ratio to one of a widescreen or landscape mode (e.g., from 9:16 to 16:9). FIG. 16 illustrates how the display layout 50 from FIG. 15 may change further when the orientation of the second source device (2) is also rotated, changing its aspect ratio to one of a widescreen or landscape mode (e.g., from 9:16 to 16:9).

While exemplary embodiments are described above, it is not intended that these embodiments describe all possible forms of the described features. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A media receiver comprising:
a memory configured to store machine-readable instructions; and
a processor circuitry in communication with the memory, wherein the processor circuitry is configured to execute the machine-readable instructions to cause the processing circuitry to:
receive a first media stream corresponding to a first media source;
obtain first metadata from the first media stream, wherein the first metadata does not specifically identify a device type of the first media source;
receive a second media stream corresponding to a second media source;
obtain second metadata from the second media stream, wherein the second metadata does not specifically identify a device type of the second media source;
determine a first source device type for the first media source based on the first metadata;
determine a second source device type for the second media source based on the second metadata;
generate an optimized display including the first media stream and the second media stream based on at least the first source device type and the second source device type; and
control transmission of the optimized display to a sink device.

2. The media receiver of claim 1, wherein the processor circuitry is configured to execute the machine-readable instructions to further cause the processing circuitry to:
receive attribute data corresponding to the sink device; and
generate the optimized display including the first media stream and the second media stream further based on the attribute data.

3. The media receiver of claim 2, wherein the attribute data corresponding to the sink device includes a predetermined user viewing distance of the sink device.

4. The media receiver of claim 1, wherein the first metadata includes MAC address classification corresponding to the first media source and the second metadata further includes MAC address classification corresponding to the second media source;
wherein the processor circuitry is configured to execute the machine-readable instructions to cause the processing circuitry to determine the first source device type for the first media source based on at least the MAC address classification corresponding to the first media source; and
wherein the processor circuitry is configured to execute the machine-readable instructions to cause the processing circuitry to determine the second source device type for the second media source based on at least the MAC address classification corresponding to the second media source.

5. The media receiver of claim 1, wherein the first metadata includes Hostname classification corresponding to the first media source and the second metadata further includes Hostname address classification corresponding to the second media source;
wherein the processor circuitry is configured to execute the machine-readable instructions to cause the processing circuitry to determine the first source device type for the first media source based on at least the Hostname classification corresponding to the first media source; and
wherein the processor circuitry is configured to execute the machine-readable instructions to cause the processing circuitry to determine the second source device type for the second media source based on at least the Hostname classification corresponding to the second media source.

6. The media receiver of claim 1, wherein the first metadata includes protocol, aspect ratio, and resolution information of the first media source and the second metadata further includes protocol, aspect ratio, and resolution information of the second media source;
   wherein the processor circuitry is configured to execute the machine-readable instructions to cause the processing circuitry to determine the first source device type for the first media source based on at least one of the protocol, aspect ratio, or resolution information of the first media source; and
   wherein the processor circuitry is configured to execute the machine-readable instructions to cause the processing circuitry to determine the second source device type for the second media source based on at least one of the protocol, aspect ratio, or resolution information of the second media source.

7. The media receiver of claim 1, wherein the first metadata includes computer vision object detection and computer vision image classification information of the first media source and the second metadata further includes computer vision object detection and computer vision image classification information of the second media source;
   wherein the processor circuitry is configured to execute the machine-readable instructions to cause the processing circuitry to determine the first source device type for the first media source based on at least one of the computer vision object detection or computer vision image classification information of the first media source; and
   wherein the processor circuitry is configured to execute the machine-readable instructions to cause the processing circuitry to determine the second source device type for the second media source based on at least one of the computer vision object detection or computer vision image classification information of the second media source.

8. The media receiver of claim 1, wherein the processor circuitry is configured to execute the machine-readable instructions to cause the processing circuitry to generate the optimized display to include:
   a first display window including a display of the first media stream; and
   a second display window including a display of the second media stream, wherein the first display window is sized differently from the second display window.

9. The media receiver of claim 1, wherein the processor circuitry is configured to execute the machine-readable instructions to cause the processing circuitry to generate the optimized display to include:
   a first display window including a display of the first media stream; and
   a second display window including a display of the second media stream, wherein the first display window has different dimensions from the second display window.

10. The media receiver of claim 1, wherein the processor circuitry is configured to execute the machine-readable instructions to cause the processing circuitry to generate the optimized display to include:
    a first display window including a display of the first media stream, the first display positioned at a first location within the optimized display selected based on the first source device type; and
    a second display window including a display of the second media stream, the second display positioned at a second location within the optimized display selected based on the second source device type.

11. A method for optimizing a display layout on a display screen, the method comprising:
    receiving, by a communication interface, a first media stream from a first media source;
    extracting, by a processor, first metadata from the first media stream, wherein the first metadata does not specifically identify a device type of the first media source;
    receiving, by the communication interface, a second media stream from a second media source;
    extracting, by the processor, second metadata from the second media stream, wherein the second metadata does not specifically identify a device type of the second media source;
    determining, by the processor, a first source device type for the first media source based on the first metadata;
    determining, by the processor, a second source device type for the second media source based on the second metadata;
    generating, by the processor, an optimized display including the first media stream and the second media stream based on at least the first source device type and the second source device type; and
    controlling, by the processor, transmission of the optimized display to a sink device.

12. The method of claim 11, the method further comprising:
    receiving, by the processor, attribute data corresponding to the sink device; and
    generating, by the processor, the optimized display including the first media stream and the second media stream further based on the attribute data.

13. The method of claim 12, wherein the attribute data corresponding to the sink device includes a predetermined user viewing distance of the sink device.

14. The method of claim 11, wherein the first metadata includes MAC address classification corresponding to the first media source and the second metadata further includes MAC address classification corresponding to the second media source;
    wherein determining the first source device type for the first media source is based on at least the MAC address classification corresponding to the first media source; and
    wherein determining the second source device type for the second media source is based on at least the MAC address classification corresponding to the second media source.

15. The method of claim 11, wherein the first metadata includes Hostname classification corresponding to the first media source and the second metadata further includes Hostname address classification corresponding to the second media source;
    wherein determining the first source device type for the first media source is based on at least the Hostname classification corresponding to the first media source; and
    wherein determining the second source device type for the second media source is based on at least the Hostname classification corresponding to the second media source.

16. The method of claim 11, wherein the first metadata includes protocol, aspect ratio, and resolution information of the first media source and the second metadata further includes protocol, aspect ratio, and resolution information of the second media source;
  wherein determining the first source device type for the first media source is based on at least one of the protocol, aspect ratio, or resolution information of the first media source; and
  wherein determining the second source device type for the second media source is based on at least one of the protocol, aspect ratio, or resolution information of the second media source.

17. The method of claim 11, wherein the first metadata includes computer vision object detection and computer vision image classification information of the first media source and the second metadata further includes computer vision object detection and computer vision image classification information of the second media source;
  wherein determining the first source device type for the first media source is based on at least one of the computer vision object detection or computer vision image classification information of the first media source; and
  wherein determining the second source device type for the second media source is based on at least one of the computer vision object detection or computer vision image classification information of the second media source.

18. The method of claim 11, wherein generating the optimized display includes:
  generating a first display window including a display of the first media stream; and
  generating a second display window including a display of the second media stream, wherein the first display window is sized differently from the second display window.

19. The method of claim 11, wherein generating the optimized display includes:
  generating a first display window including a display of the first media stream; and
  generating a second display window including a display of the second media stream, wherein the first display window has different dimensions from the second display window.

20. The method of claim 11, wherein generating the optimized display includes:
  generating a first display window including a display of the first media stream, the first display positioned at a first location within the optimized display selected based on the first source device type; and
  generating a second display window including a display of the second media stream, the second display positioned at a second location within the optimized display selected based on the second source device type.

21. The media receiver of claim 1, wherein the first source device type for the first media source is determined to be one of a laptop, personal computer, phone, tablet or another media streaming device.

22. The method of claim 11, wherein determining, by the processor, the first source device type for the first media source based on the first metadata comprises determining the first source device type to be one of a laptop, personal computer, phone, tablet, or another media streaming device.

* * * * *